United States Patent [19]
Gleason et al.

[11] Patent Number: 5,561,097
[45] Date of Patent: Oct. 1, 1996

[54] METHOD OF CONTROLLING DENSITY OF LIGAND COUPLED ONTO SUPPORTS AND PRODUCTS PRODUCED THEREFROM

[75] Inventors: Raymond M. Gleason, Eagan; Jerald K. Rasmussen, May Township, Washington County both of Minn.

[73] Assignee: Minnesota Mining and Manufacturing Company, St. Paul, Minn.

[21] Appl. No.: 234,654

[22] Filed: Apr. 28, 1994

[51] Int. Cl.$^6$ .................................. B01J 20/26
[52] U.S. Cl. ................... 502/402; 502/401; 502/403; 502/159; 502/162; 502/168; 502/172
[58] Field of Search .................... 502/401, 402, 502/403, 159, 162, 168, 172

[56] References Cited

U.S. PATENT DOCUMENTS

| | | | |
|---|---|---|---|
| 4,212,905 | 7/1980 | Tsibris | 427/221 |
| 4,451,619 | 5/1984 | Heilmann et al. | 525/379 |
| 4,582,875 | 4/1986 | Ngo | 525/54.11 |
| 4,737,560 | 4/1988 | Heilmann et al. | 526/304 |
| 4,871,824 | 10/1989 | Heilmann et al. | 526/304 |
| 4,968,742 | 11/1990 | Lewis et al. | 525/54.1 |
| 5,013,795 | 5/1991 | Coleman et al. | 525/279 |
| 5,200,471 | 4/1993 | Coleman et al. | 525/326.9 |
| 5,262,484 | 11/1993 | Coleman et al. | 525/204 |
| 5,292,514 | 3/1994 | Capecchi et al. | 424/422 |
| 5,292,840 | 3/1994 | Heilmann et al. | 526/304 |

FOREIGN PATENT DOCUMENTS

| | | | |
|---|---|---|---|
| 0317796A1 | 5/1989 | European Pat. Off. | G01N 33/532 |
| 0437912A1 | 7/1991 | European Pat. Off. | B01J 20/32 |
| WO79/00609 | 8/1979 | WIPO | C07G 7/00 |
| WO79/00541 | 8/1979 | WIPO | C08B 37/12 |
| WO90/09238 | 8/1990 | WIPO | B01J 20/32 |
| 0565978A1 | 10/1993 | WIPO | B01J 20/32 |

OTHER PUBLICATIONS

Velander et al., "The Use of Fab–Masking Antigens to Enhance the Activity of Immobilized Antibodies", *Biotechnology and Bioengineering*, vol. 39, 1013–1023 (1992).

Landgrebe et al., "Preparation of Chromatographic Supports of Variable Ligand Density", *Anal. Chem.*, 58, 1607–1611 (1986).

Wu et al., "Effects of stationary phase ligand density of high performance ion–exchange chromatography of proteins", *Journal of Chromatography*, 598, 7–13 (1992).

Wirth, H. et al., "Influence of Ligand Density on the Properties of Metal–Chelate Affinity Supports", *Analytical Biochemistry*, vol. 208, pp. 16–25 (1993).

*Primary Examiner*—Asok Pal
*Assistant Examiner*—In Suk Bullock
*Attorney, Agent, or Firm*—Gary L. Griswold; Walter N. Kirn; John H. Hornickel

[57] ABSTRACT

A method is disclosed for controlling the coupling low molecular weight ligands to activated sites on a support in competition with a quencher of the activated sites. Derivatized supports produced by the method have optimal ligate binding without overly dense binding sites or stearic effects. Azlactone-functional supports, especially porous supports such as porous particles, benefit from control of ligand density. A linear relationship exists between the molar ratio of ligand and quencher and the coupled ligand density. Optionally, hydrophilicity of the derivatized support can be determined by selection of quencher relative to selection of ligand.

17 Claims, No Drawings

METHOD OF CONTROLLING DENSITY OF LIGAND COUPLED ONTO SUPPORTS AND PRODUCTS PRODUCED THEREFROM

FIELD OF THE INVENTION

This invention concerns a method of controlling the density of ligands covalently coupled onto a support and the products produced from such method.

BACKGROUND OF THE INVENTION

Derivatization of polymeric supports is central to the preparation of various types of diagnostic and chromatographic media. Coupling of ligands to supports, i.e. covalent attachment of specific molecules or functional groups, is necessary to impart to those supports the ability to effect the separation, identification, and/or purification of molecules of interest. Prior art techniques for controlling the concentration or density of ligands on a polymeric support generally fall into one of four categories or combinations thereof:

a) Manipulation of reaction conditions which "activate" the matrix, i.e. which introduce a reactive group which can couple to the ligand. This often involves varying the concentration of "activating reagents", reaction time, reaction temperature, pH, or combinations of these variables.

b) Manipulation of reaction conditions during coupling of the ligand to the support. This may involve varying the concentration and/or the total amount of ligand the support is challenged with, ionic strength of the coupling buffer, and type of salt in the coupling buffer as well as the variables of time, temperature, pH, etc., mentioned above.

c) Manipulation of the amount of reactive or "activatable" functional group incorporated into the polymer support by varying polymer composition at the time of its formation, i.e. during the polymerization.

d) Manipulation of the amount of ligand incorporated into the polymer by preparation of a polymerizable ligand monomer and varying the concentration of this monomer in the monomer feed during polymerization.

For the most part, the above techniques for controlling ligand concentration on polymeric supports are quite difficult to apply in a practical and reproducible manner, primarily because of the large number of variables which must be simultaneously controlled. This is especially true of the first two techniques, in which the efficiencies of the reactions (i.e., extent of desired reaction as opposed to competing side reactions) is strongly influenced by reaction conditions. Technique "c" seems to offer some degree of control, although one must subsequently apply the techniques of "a" and/or "b" in a second step to couple the ligand. Technique "d" would appear to provide exact control of ligand density until one realizes that many of the ligands which are useful for diagnostic applications and chromatographic separations contain functional groups which are incompatible with conditions necessary for formation of the desired polymer (e.g., they are unstable under the contemplated polymerization conditions, or they interfere with the polymerization reaction, such as by inhibition of polymerization).

Successful ligand coupling is based on two factors: quantity immobilized and quality of immobilization. Quantity immobilized, expressed as weight of ligand per unit volume of support, is an indicator of the amount of ligand coupled regardless of the quality of that immobilization. Quality of immobilization is an indicator of the relationship between the amount of ligand coupled onto a support and the ability of that ligand to maintain its binding interactions with a ligate such that it retains usefulness for chromatographic or diagnostic activity. Optimizing that activity is desirable and can be accomplished by manipulating either quantity or quality of immobilization, or both, depending on the desired use application. However, there must be enough ligand density to achieve practical utility.

While a support can couple at maximum ligand density, the binding of ligate to that ligand during chromatography can be hindered or altered by a number of factors including multiple-site binding of the ligand to the support (especially relevant with high molecular weight ligands) and steric hindrance due to proximity of adjacent ligands. Thus, overly-dense ligand coupling to a support is wasteful of the ligand and unnecessary or deleterious to the binding activity, especially for such applications as affinity chromatography and diagnostics. In these instances, the optimal condition in ligand coupling would be the achievement of maximum possible density of ligand coupled while maintaining maximum chromatographic or diagnostic activity with respect to ligate binding to said ligand. That results in optimal ligate binding or functional efficiency of the coupled ligand on the support.

For other chromatographic separations, such as for hydrophobic interaction or reverse phase, chiral, and ion exchange chromatography, high quantity of immobilization may lead to too strong a binding interaction, thus leading to difficult elutions or losses in resolution. In these cases, the ability to decrease ligand density or alter its distribution will improve chromatographic performance in terms of selectivity, resolution, and recovery of ligate.

Many ligand candidates are large molecules such as proteins and enzymes that have specific conformations necessary to retain biological activity. Recently attempts have been made to overcome the limitations in the prior art with respect to coupling of these high molecular weight ligands. In the case of antibody binding of antigen, low antigen binding efficiencies have been attributed to the concerted actions of surface density of antibody, multi-point attachment of antibody to porous supports, and undesirably restrictive conformations imposed by covalent attachment. See Velander et at., "The Use of Fab-Masking Antigens to Enhance the Activity of Immobilized Antibodies", *Biotechnology and Bioengineering*, Vol. 39, 1013–1023 (1992) which discloses how enhanced functional efficiency was achieved when the Fab portion of a monoclonal antibody was masked with synthetic antigens prior to covalent immobilization of the antibody on the support, followed by unmasking.

U.S. Pat. No. 5,200,471 (Coleman et al.) describes a method for the covalent immobilization of biomolecules on azlactone-functional polymeric supports in the presence of polyanionic salt and a buffered aqueous solution. Preferably, the immobilization also occurs in the presence of an azlactone quencher, i.e. another molecule which will compete with the protein ligand for the azlactone groups through which covalent coupling occurs. Incorporation of the quencher in this procedure in concentrations in the range of 4 to 6 orders of magnitude higher than the concentration of the biomolecule seems to have some effect on controlling the density of the coupled protein ligand. However, its major effect appears to be manifest in improvements in bound specific biological activity of the ligand.

Other attempts to control ligand density and/or distribution of biomolecules are described in U.S. patent application Ser. No. 08/038,645 (Velander et al.) and in references therein.

Using a very different approach, U.S. Pat. No. 4,968,742 (Lewis et al.) teaches a two step process for control of ligand density by controlling the number of active sites for ligand coupling. Step one of the complicated process involves reacting the non-activated polymeric material with a predetermined ratio of excess amounts of an "activating" agent and a "blocking" agent. In a second step, the ligand without any other agent competing for coupling sites is covalently coupled to a functional group on the "activating" agent. While this method again offers some degree of control over the density of ligands, it is still somewhat limited. The method indeed only allows control over the introduction of the "activating" agent, with the, subsequent coupling of the ligand being subject to the deficiencies discussed above.

SUMMARY OF THE INVENTION

Controlling ligand density on a support is a problem unsolved sufficiently in the prior art for low molecular weight ligands without complicated multi-step procedures. The deficiencies of the prior art are overcome by the present invention.

In the present invention, ligand is covalently coupled in the presence of a suitable quencher in a single step.

The method solves the problem of controlling ligand density by reacting the polymer support with a mixture of the ligand and quencher, the molar ratio of ligand to quencher in the mixture being essentially the ratio desired to be coupled to the support.

The method avoids excessive usage of quencher relative to the amount of ligand to be coupled and avoids the requirement of coupling in a buffered aqueous solution having a high concentration of polyanionic salts therein, as is required in U.S. Pat. No. 5,200,471.

The method of the present invention is particularly advantageous for the coupling of small molecule ligands (i.e. low molecular weight ligands below about 1000 atomic mass units) for the purposes of preparing ion exchange, hydrophobic interaction or reverse phase, chiral, and affinity chromatography supports.

Preferred supports for coupling are azlactone-functional supports.

Preferred ligands and quenchers comprise primary and secondary amine-functional molecules.

Products produced from the method of the present invention are advantageous in that ligand density of low molecular weight ligands is controlled for optimal ligate binding with minimal unnecessary use of ligand for coupling to the support.

A feature of the present invention is comparatively unrestricted reaction conditions for covalent coupling of ligand to the support. That is, relatively broad ranges of reactions conditions such as concentration, time, temperature, etc., can be used without significantly affecting the outcome of the coupling reaction.

Another feature of the present invention is ability to control the ligand density without first requiring a step to activate or deactivate reaction sites on the support.

An advantage of the present invention is the ease with which ligand density on the support can be manipulated in a single step coupling reaction. This can be a powerful tool for optimization of a chromatographic separation by optimizing ligate binding and elution.

In describing the present invention:

"Ligand" means a molecule or species covalently immobilized on a support and which comprises functional group(s) which interact with other species in solution (ligates) by ionic, hydrophobic, hydrogen-bonding, etc., type interactions.

"Ligate" means a molecule or species which can interact, in a reversible manner, with a support comprising an immobilized ligand.

"Coupling" refers to immobilizing, by means of a covalent chemical bond, a ligand to a support; this is generally an irreversible reaction.

"Binding" refers to the interaction of the ligate with the coupled ligand; this is generally a reversible reaction which can be disrupted by changes in pH, ionic strength, etc., of the solution.

"Directly covalently reactive" and words of similar import refer to supports having functional groups associated therewith that do not require further reaction in order to couple ligands to a support.

"Density" refers to the concentration of ligand on a support and is generally described in terms of either weight or molar equivalents of ligand per unit weight or volume of support.

"Resolution" means the degree of separation of two adjacent eluting solutes (ligates) in a chromatographic run.

"Selectivity" is another term describing separation of solutes in a chromatographic run and is used herein to refer to the overall chromatographic profile (retention time, separation, elution order, etc.) for a series of ligates.

"Recovery" refers to the amount of purified ligate able to be eluted from a chromatographic column relative to the amount available in the originally applied feed.

EMBODIMENTS OF THE INVENTION

Supports

Acceptable supports for use in the present invention can vary widely within the scope of the invention. A support can be porous or nonporous, depending on preferred final use. A support can be continuous or non-continuous depending on ultimate desired usage. A support can be made of a variety of materials, including supports made of ceramic, glassy, metallic, or polymeric materials or combinations of materials. A support can be flexible or inflexible depending on ultimate desired usage.

Preferred supports include polymeric supports, such as particulate or beaded supports, woven and nonwoven webs (such as fibrous webs), microporous fibers, and microporous membranes.

Woven and nonwoven webs having either regular or irregular physical configurations of surfaces are useful as supports. Fibrous webs are particularly desired because such webs provide large surface areas, with nonwoven fibrous webs being preferred due to ease of manufacture, low material cost, and allowance for variation in fiber texture and fiber density. A wide variety of fiber diameters, e.g., 0.05 to 50 micrometers, can be used. Web thickness can be varied widely to fit the application, e.g., 0.2 micrometer to 100 cm thick or more. Fibrous webs can be prepared by methods known in the art, or by modifications of methods known in the art.

Pre-existing, polymeric supports can also include microporous membranes, fibers, hollow fibers, or tubes, all of which are known in the art.

Ceramic supports, glass supports, and metallic supports are all known in the art and are commercially available or can be prepared by a variety of known techniques.

Generally, supports useful in the present invention are described in U.S. patent application Ser. Nos. 08/038,645 (Velander et al.); 07/896,107 (Gagnon et al.); and 07/776,601 (Rasmussen et at.), the disclosures of which are incorporated by reference herein.

Preferably, the supports for use in the present invention are porous supports and include those commercially available for chromatography techniques. The porous support can be any porous solid, whether natural or synthetic, organic or inorganic, having a porous structure and which is insoluble in water or aqueous solutions. Suitable solids with a porous structure have pores of a diameter of at least 1.0 nanometers (nm) and a pore volume of over 0.1 cm$^3$/g. Preferably, the pore diameter is at least 30 nm because larger pores will be less restrictive to diffusion. Preferably, the pore volume is at least 0.5 cm$^3$/g for greater potential capacity due to greater surface area surrounding the pores. Preferred porous supports include particulate or beaded supports.

In order to be useful for the purposes of the invention, the support must be a reactive support; that is, it must comprise a reactive functional group which can be used for coupling to the desired ligand. That reactive functional group should be capable of undergoing rapid, direct covalent coupling with the desired ligand to form derivatized supports. The covalently reactive functional groups which are useful for the purposes of the invention can be classified in general as electrophiles. Reaction with a nucleophile (e.g. amine, alcohol, or mercaptan) produces a covalent chemical bond either by an addition reaction or by a displacement or substitution type reaction (in which a byproduct molecule is released). Addition type reactions are preferred. While it is possible to use the various "activating chemistries" well known in the art to introduce reactive functional groups useful, at least to a certain extent, for the purposes of this invention, this approach is subject to the problems described earlier which make it difficult to achieve reproducible results. Thus, it is preferred to utilize supports, especially commercially available supports, which can be obtained with a reproducible level of reactive functionality.

A number of useful particles and membranes are commercially available which contain reactive functional groups. These useful reactive functional groups include N-hydroxysuccinimide esters, sulfonyl esters, iodoacetyl groups, aldehydes, imidazolyl carbamates, and cyanogen bromide activated supports.

Generally, these reactive functional groups are described in U.S. patent application Ser. Nos. 08/038,645 (Velander et al.) and 07/776,601 (Rasmussen et at.), the disclosures of which are incorporated by reference herein.

Although these functional groups may be used in the method described herein, they are not preferred because they are subject to a number of problems including thermal instabilities and secondary reactions or hydrolysis reactions which can compete with the desired coupling reaction.

Particularly preferred as reactive supports useful in the present invention are supports having azlactone-functional groups on internal and/or external surfaces of such supports. Thus, such reactive supports have an azlactone-functional group of Formula I:

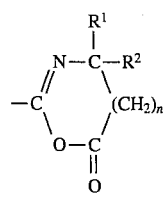

wherein:

$R^1$ and $R^2$ independently can be an alkyl group having 1 to 14 carbon atoms, a cycloalkyl group having 3 to 14 carbon atoms, an aryl group having 5 to 12 ring atoms, an arenyl group having 6 to 26 carbon atoms and 0 to 3 S, N, and nonperoxidic O heteroatoms, or $R^1$ and $R^2$ taken together with the carbon to which they are joined can form a carbocyclic ring containing 4 to 12 ring atoms, and n is an integer 0 or 1.

Azlactone-functional reactive supports are particularly preferred in the present invention because such supports rapidly and directly covalently couple ligands better and with fewer side reactions (e.g., hydrolysis) than other commercially available supports reactive functional groups. Further, such azlactone-functional groups are quite stable prior to covalent coupling with a ligand. Further, covalent coupling of a ligand with an azlactone-functional group causes no displacement of a hazardous byproduct molecule, which minimizes problems of purification of the article after covalent coupling of the ligand.

Also, azlactone,-functional supports are known to possess high covalent coupling capacities with nucleophilic ligands. Further, such high covalent coupling capacities provides the ability to control ligand density over a wide range according to the present invention. Thus, an azlactone-functional reactive particle is particularly preferred for use in the present invention.

Azlactone-functional polymeric particles can be made, for example, by copolymerization of a (meth)acryloylamino acid with a variety of other free radically polymerizable comonomers followed by reaction with a cyclizing agent, as described in U.S. Pat. Nos. 4,737,560 and 4,871,824, which are incorporated herein by reference, or by copolymerization of an alkenyl azlactone with other comonomers as described in U.S. Pat. No. 5,292,840, which is incorporated herein by reference. Azlactone-functional particles can also be prepared by solution coating an azlactone-functional polymer onto an organic or inorganic particle or support, also as described in U.S. Pat. No. 5,292,840.

Azlactone-functional particles can also be produced by graft polymerization onto base supports which contain aliphatic hydroxyl groups on their surfaces as described in European Patent Disclosure 0,565,978 A1, the disclosures; of which are incorporated by reference.

Azlactone-functional reactive particles can also be made from azlactone graft copolymers which are disclosed in U.S. Pat. Nos. 5,013,795 and 5,262,484, the disclosures of which are incorporated by reference.

Size of azlactone-functional particles can be from about 0.1 to 1,000 micrometers and preferably from 0.5 to 250 micrometers. Dry azlactone-functional particles can have an average pore size ranging from about 1 to about 300 nanometers and preferably from 5 to about 200 nanometers. Azlactone-functional particles can have an average pore volume of at least 1.0 cm$^3$/g of particle. In a particle having a size of 50–80 micrometers, a pore volume of at least 1.2 cm$^3$/g provides a pore volume of about 60% of the particle volume. In the same particle, the surface area is at least 50 m$^2$/g. Thus, there is substantial surface area within an azlactone-functional particle available for covalent immobilization according to the present invention.

Most preferably, porous supports useful for the present invention are Emphaze™ brand porous azlactone-functional activated affinity chromatography beads commercially available from Minnesota Mining and Manufacturing Company of St. Paul, Minn.

Other azlactone,-functional supports are also useful in the present invention. Pre-existing supports, such as fibrous supports and microporous membranes, can be rendered azlactone-functional using the disclosure of copending and coassigned U.S. patent application Ser. No. 07/896,107, the disclosure of which is incorporated by reference herein. Multi-functional azlactone supports disclosed in U.S. Pat. No. 5,292,514 (Capecchi et al.), the disclosure of which is incorporated by reference, are also useful as supports for the present invention. Azlactone-functional particles can also be incorporated into continuous porous matrices as disclosed in copending and coassigned U.S. patent application Ser. No. 07/776,601, the disclosure of which is incorporated by reference herein.

Ligands for Covalent Immobilization

As stated above, reactive functional groups on porous supports are desirably electrophiles. Thus, for direct covalent immobilization, ligands useful in the present invention contain nucleophilic groups for coupling to the electrophilic groups of the support. Nonlimiting examples of ligand nucleophilic functional groups include primary and secondary amines, alcohols, and mercaptans. Of these, amine-functional ligands are especially preferred.

Ligands useful for the preparation of derivatized supports can vary widely within the scope of the present invention. In order to be useful as a ligand, the molecule must contain some other functional group (or groups) useful in the contemplated end use application. Preferably, a ligand is chosen based upon the desired use of the derivatized support. End uses include applications as chromatographic supports, diagnostic reagents, metal ion complexation or removal, etc. For example, carboxylic or sulfonic acid containing ligands are useful for the preparation of cation exchange supports, while amine containing ligands (primary, secondary, or tertiary amines) are useful for the preparation of anion exchange supports. Ligands containing aromatic or aliphatic groups are useful for the preparation of supports for hydrophobic interaction or reverse phase chromatography. Ligands containing functional groups which undergo specific binding interaction with biological molecules are useful for the preparation of affinity supports or diagnostic reagents.

Once ligands are coupled according to methods of the present invention, such ligands are available for biological or chemical interaction with an enhanced functional efficiency, such as adsorbing, complexing, catalysis, or reagent end use.

Derivatized supports are useful as adsorbents, complexing agents, catalysts, reagents, and as chromatographic articles.

Ligands useful in the present invention generally have a low molecular weight, i.e., below about 1000 atomic mass units. Presently preferred azlactone-functional groups will undergo nucleophilic attack by amines, thiols, and alcohols. Thus, ligands having at least one amine, thiol, or alcohol group thereon are candidates for covalent immobilization on an azlactone-functional support. For reasons of increased stability of the linkage formed upon coupling, amine-functional ligands are preferred for the purposes of the present invention. Nonlimiting examples of such ligand materials include amine-containing compounds such as amino acids, diamines, aromatic amines, primary and secondary aliphatic amines, and hydrazines and hydrazides.

Quencher

The type of quencher can vary according to the nature of the ligand to be coupled to the support. However, the quencher must have reactivity with the same activated site on the support as does the ligand. The kinetics of reaction (as influenced by pH, ligand concentration, reaction time, and temperature, among other factors) between the support and the ligand determine the amount and type of quencher to be used.

Preferably, the quencher will have essentially the same kinetics of reaction with the support as does the ligand. Thus, if the ligand has a primary amine nucleophile for coupling to the support, the quencher will also preferably comprise a primary amine nucleophile. When this condition holds, the density of coupled ligand is essentially controlled by the molar ratio of the ligand and quencher in the coupling solution. However, as is well known to one skilled in the art, the ligand and the quencher will not exhibit exactly identical kinetics of reaction with the support. Substituents on either the ligand or the quencher will influence the nucleophilicity of the respective reactants as well as contribute to the steric environment around the nucleophilic groups. Both of these effects may influence the overall kinetics of the coupling reaction.

While not being limited to a particular theory, a quencher competes for the reactive sites on a porous support where ligand would otherwise couple. The reduction in the number of reactive sites can limit the possibility that ligand couples in a manner that creates overly dense binding sites or otherwise alters the conformation of biologically active ligates bound to such sites, reducing or eliminating binding activity. Unexpectedly, it is believed that a quencher optimizes ligate binding by providing a sparcity of reactive sites without eliminating too many reactive sites for binding. This also tends to result in a more uniform or effective distribution of coupled ligand.

Optionally, the choice of quencher may be made so as to not only control ligand density but also to influence the resultant hydrophilicity or hydrophobicity of the derivatized support matrix. Use of a very hydrophilic quencher (ammonia, for example) will result in the formation of a much more hydrophilic environment surrounding the coupled ligand than that which will result from use of a more hydrophobic quencher (such as ethanolamine or ethylamine, for example). This result may be very important when one wants to maximize specific interactions of the ligand with the desired ligate, as for example in affinity or diagnostic applications. Alternatively, use of a more hydrophobic quencher may promote weaker, secondary interactions of ligates with the surrounding matrix. Such effects are useful in control of chromatographic selectivity and resolution. Thus, the ability to control both ligand density and hydrophilic/hydrophobic effects can be very powerful for optimization of chromatographic performance.

When preferred azlactone-functional porous supports are used, quenchers are azlactone quenchers. Suitable azlactone quenchers are also identified in U.S. Pat. No. 5,200,471 (Coleman et al.), the disclosure of which is incorporated by reference.

Nonlimiting examples of azlactone quenchers for use include ethanolamine, hydroxylamine, methylamine, aniline, ethylamine, ammonium hydroxide, ammonium sulfate, butylamine, glycinamide, TRIS (trishydroxymethylaminomethane), glycerylamine, glucosamine, acethydrazide, and combinations thereof.

The concentration of azlactone quencher in the reaction medium can range from about 0.01M to about 10M. Desirably, the range may be between about 0.05M to about 2M. When ethanolamine serves as azlactone quencher, the concentration may range from about 0.1M to about 1M. The presently preferred concentration of ethanolamine as azlactone quencher is about 0.1M to about 0.5M.

Method of Competing Covalent Immobilization

The method of the present invention involves a single step in which the desired ligand and the quencher compete for the same activated sites on the support.

The reaction conditions for competing covalent immobilization of desired ligand and quencher are nonspecific and variable without otherwise affecting the competition of ligand and quencher for the same activated sites on the support.

The reaction solvent can be aqueous, organic, or mixed but should be capable of dissolving or sufficiently dispersing both ligand and quencher for true competition. The medium can be buffered or non-buffered but should not favor ligand over quencher, or vice versa. The medium can have a low or high concentration of polyanionic salts, as the presence of these salts generally does not affect the coupling.

The reaction temperature is preferably ambient but can vary from about 0° C. to about the boiling point of the solvent. The reaction pressure can be ambient.

Concentrations of ligand and quencher in the reaction medium should be comparable, i.e., within two orders of magnitude and preferably within one order of magnitude. Most preferably, the molar ratio of ligand concentration to quencher concentration can range from about 20:1 to about 1:20. In addition, the combined concentrations of ligand and quencher (reactants) should be such that there is an excess on an equivalent basis relative to the total quantity of reactive functional groups on the support. Although satisfactory results can sometimes be obtained with an equivalent ratio of reactants to functional groups of about 2:1, best results are obtained with a ratio of at least 10:1, preferably of about 20:1, and most preferably of about 100:1.

The reaction solution usually does not require buffering agents, especially when the nucleophile is a primary or secondary amine, but may include buffering agents if so desired. Buffering agents for aqueous media include acetate, phosphate, pyrophosphate, borate, and other salts known to those skilled in the art, such as those buffering agents disclosed in Good et al., *Biochemistry*, 5, (1966) p. 467 et seq. (the disclosure of which is incorporated by reference herein).

The concentration of buffering agents in aqueous media can range from about 10 mM to about 750 mM and desirably from about 50 mM to about 200 mM, inclusive, depending on the concentration of ligand and quencher chosen for coupling and the concentrations of other optional ingredients that can affect the ionic strength of the reaction solution or the solubilities of the ligand and quencher.

The duration of the competing immobilization should be sufficient in length to assure completed covalent coupling of ligand and quencher. From about 15 to about 240 minutes is usually sufficient, although longer reaction times can be used. Thus, the covalent immobilization even with competing quencher present is completed rapidly.

Coupling conditions are enhanced when pH of a reaction solution is changed to a pH within one pKa of the nucleophilic ligand, usually within a range from about 3 to about 12. A pH of this range provides coupling conditions that maximize the reaction of a nucleophilic group on a ligand or quencher with an electrophilic group on the surface of a support. However, the exact pH range chosen for coupling will depend upon the type of nucleophilic group present on the ligand and quencher. Thus, with primary or secondary aliphatic amine nucleophiles, a pH range of about 9 to about 12, preferably from about 11 to about 12 is used. With aromatic amines, a pH in the range of about 3 to about 6, preferably from about 4 to 5 is used. Also with aromatic, amines, a condensation agent such as a carbodiimide is preferably used. These conditions cause rapid and assured coupling of ligand and quencher to the support.

The rate of coupling is a function of the rate constant of coupling, the concentration of ligand, nucleophilicity of ligand and quencher, reactivity of the functional groups per unit area of the support, pH, and temperature, etc. In short, reaction kinetics for ligand and reaction kinetics for quencher should be understood and not employed to favor ligand over quencher, or vice versa, unless the amount of ligand density or hydrophilicity desired requires favoring a relatively unreactive quencher to compete with a very reactive ligand, or vice versa. However, when an excess of ligand plus quencher with respect to reactive functional groups is used as described above, these other reaction variables have relatively little influence over the outcome of the immobilization reaction.

As seen in the Examples below, unexpectedly, it has been found that with presently preferred azlactone-functional supports, a linear relationship generally obtains between the molar ratio of ligand and quencher and the final coupled ligand density. In addition, a linear relationship is generally observed between coupled ligand density and chromatographic capacity for protein ligates. These findings indicate the surprising absence of competing side reactions during immobilization and that all coupled ligand is capable of successful interaction with ligate, even at relatively high ligand densities. Thus, it is relatively, but unexpectedly easy in this situation to determine the molar ratio needed to obtain an optimized coupled ligand density or ligate capacity even when one does not have detailed kinetic information related to ligand and/or quencher reaction with the support. One can simply conduct two or three quick screening reactions (for example, 1-couple ligand in absence of quencher, 2-couple ligand and quencher at comparable concentrations, and 3-couple ligand in the presence of high concentration of quencher), evaluate either ligand density or chromatographic performance, plot the data, and use the linear relationship obtained to optimize ligand density. That linear relationship further militates toward the use of azlactone-functional supports in the method of the present invention.

As will be obvious to one skilled in the art, the slopes of the above described linear relationships will be affected to some degree by the relative kinetics of reaction of ligand versus quencher or by the relative strengths of the interactions of ligand with ligates. Therefore, each particular application may require separate optimization. In other words, the particular ligand density (and, optionally, hydrophilicity) which will give an optimal chromatographic purification of a particular protein from a particular feedstream may not by optimal for a different protein or a different feedstream.

However, using the method of the present invention greatly facilitates the necessary optimization process due to the fact that rigorous control over multiple reaction condition variables is not needed.

Usefulness of the Invention

The method of the present invention provides a process of optimizing ligand density on supports in such a fashion as to minimize surface crowding which can couple ligand without ligate binding benefit. Alternatively, the method provides a process for controlling ligand density in such a fashion as to minimize ligate binding which is too strong to allow easy elution. In addition, the method provides a process for optimizing ligand density in such a fashion as to optimize chromatographic performance. The derivatized support has coupled ligand with a controlled ligand density, optionally with a modified hydrophilicity or hydrophobicity, resulting in optimal ligate binding or optimal chromatographic resolution, selectivity, and recovery. In turn, the use of the derivatized support achieves a degree of control over selectivity of ligate binding and recovery of desired ligate that has not been known previously in the art.

Optimal ligand coupling can be expressed in terms of ligand density on the support using molar or mass concentration of ligand coupled per mass or volume of support, or molar or mass concentration of ligand coupled per unit area of support. Maximum ligand density obtainable for any support will be determined by the concentration of reactive functional groups originally present on the support. Ligand density can range from about 10% to about 99% of the original activated sites.

Azlactone-functional supports react with ligands to form adduct supports according to the reactions described in U.S. Pat. No. 5,292,840, the disclosure of which is incorporated by reference.

For a greater understanding of the scope of the invention, the following examples are provided.

Procedures

Cation Exchange Capacity: A 15 ml polypropylene disposable chromatography column was packed with 1 ml of derivatized bead support. The column was then equilibrated by washing with 10 ml of loading buffer, 10 mM MOPS (4-morpholinepropanesulfonic acid)/pH 7.5, and loaded with 10 ml of protein solution (chicken egg white lysozyme, pI 11.0, from Sigma Chemical Co., St. Louis, Mo., 10 mg/ml in the MOPS buffer). Unbound lysozyme was washed off with 30 ml of the MOPS buffer (three 10 ml fractions). Finally, bound protein was eluted with 15 ml of 1M NaCl in MOPS buffer. Protein recovered in the various fractions was determined by measuring the UV absorbance at 280 nm using a Hewlett-Packard Diode Array Spectrophotometer, Model 8452A, and compared to a standard curve prepared using pure lysozyme. The amount of protein recovered in the NaCl eluate was equated to the cation exchange capacity for the support.

Anion Exchange Capacity: The procedure used was identical to that above for cation exchange capacity except that the protein loaded was bovine serum albumin (BSA, Sigma Chemical Co.). Pure BSA was also used to construct the standard curve.

Ligand, quencher, and buffer solution preparation: All solutions were prepared, unless otherwise noted, in deionized water. When necessary, pH was adjusted with either 10M sodium hydroxide or 10N hydrochloric acid, as appropriate. All chemicals, buffer salts, etc., were commercial materials purchased from either Aldrich Chemical Co., Milwaukee, Wis., or Sigma Chemical Co., St. Louis, Mo., and used as received.

EXAMPLES 1–5

These examples illustrate the control of ligand density for the preparation of carboxyl-functional beads, useful for cation exchange chromatography. The following solutions were prepared:

Solution A (ligand solution)—1M aspartic acid, pH 9.0

Solution B (quencher solution)—3M Ethanolamine, pH 9.0

Mixtures of solutions A and B were then prepared; 5 ml of each mixture was added to 125 mg Emphaze Biosupport Medium AB 1 beads (azlactone-functional bead available from 3M Bioapplications, St. Paul, Minn., having an azlactone functionality of approximately 40–45 micromoles/ml of support), vortexed, and the resultant slurry allowed to react at room temperature with end-over-end agitation for two hours, filtered, washed with deionized water (3×10 ml), 1% HCl (10 ml), and finally with deionized water until the eluate was of neutral pH. The results of the derivatizations were assayed by measuring cation exchange capacity for lysozyme (Table 1).

TABLE 1

| | Preparation of Carboxyl-functional Beads | | | |
|---|---|---|---|---|
| Example | Solution A (ml) | Solution B (ml) | Molar Ratio | IEX Capacity (mg/ml) |
| 1 | 0 | 10 | 0:100 | 5.1 |
| 2 | 5 | 5 | 25:75 | 21.5 |
| 3 | 6 | 2 | 50:50 | 31.3 |
| 4 | 9 | 1 | 75:25 | 38.5 |
| 5 | 10 | 0 | 100:0 | 48.7 |

When ion exchange capacity is plotted versus the molar ratio of ligand (aspartic acid) to quencher (ethanolamine) concentration, a linear relationship is observed. This relationship can be used to prepare derivatized beads having IEX capacities different from those of the above examples simply by making the appropriate mixture of solutions A and B.

EXAMPLES 6–11

The following examples illustrate the control of ligand density in the preparation of amine-functional beads which are useful for anion exchange chromatography. The following solutions were prepared:

Solution A (ligand solution)—0.5M 1,6-hexanediamine, pH 11.0

Solution B (quencher solution)—1.0M ammonia, pH 11.0

Mixtures of solutions A and B were prepared (20 ml each), reacted with Emphaze AB 1 beads (1.00 g, corresponding to 8 ml when hydrated) for 2 hours at room temperature, then worked up by washing with deionized water until the eluate was of neutral pH. The quantity of immobilized amine ligand was analyzed as follows. The derivatized beads were washed successively (using a Buechner funnel, filter flask, and water aspirator setup) with 300 ml of deionized water, 300 ml of 0.1N HCl, and 300 ml 0.0001N HCl. Following the final wash, vacuum was maintained until the majority of the liquid had been removed and only a damp filter cake remained. The filter funnel with the filter cake was transferred to a clean 250 ml filter flask, and the ionically-bound chloride ions were displaced by washing with two 50 ml portions of 10% (wt/wt) sodium sulfate. During each washing, the beads were suspended and allowed to stand in the solution for 1 minute prior to filtration. The combined sodium sulfate filtrates were mixed with 1 ml of 5% (wt/wt) potassium chromate, stirred vigorously with a magnetic stirrer, and titrated with 0.2500M silver nitrate to the faint red end point, noting the volume of titrant required. A sample of underivatized beads was used to determine a blank titration volume. The difference between the sample volume and the blank volume was used to calculate the amine content in micromoles/ml of bead support. Anion exchange capacity was determined using BSA (Table 2).

TABLE 2

Preparation of Amine-functional Beads

| Ex. | Solution A (ml) | Solution B (ml) | Amine Content | IEX Capacity (mg/ml) |
|---|---|---|---|---|
| 6  | 4  | 16 | 18.8 | 11.7 |
| 7  | 8  | 12 | 25.6 | 20.8 |
| 8  | 10 | 10 | 29.6 | 24.4 |
| 9  | 12 | 8  | 29.0 | 25.4 |
| 10 | 16 | 4  | 34.4 | 28.2 |
| 11 | 20 | 0  | 41.5 | 32.5 |

When anion exchange capacity is plotted versus amine content, again a linear correlation is observed which can be used to determine reaction conditions necessary to produce a derivatized bead having the desired ligand density (or corresponding IEX capacity).

EXAMPLE 12–15

The following solutions were prepared:

Solution A (ligand solution)—0.5M ethylenediamine

Solution B (quencher solution)—1.0M ammonia

Solution C (quencher solution)—1.0M ethanolamine

Mixtures of solutions A and either B or C were prepared and reacted with Emphaze AB 1 beads as in Examples 6–11, except that 1.25 grams of beads (corresponding to 10 ml when hydrated) were used for each reaction. Amine content (ligand density) was measured by a titration procedure similar to that used in Examples 6–11, and anion exchange capacity was measured similarly using BSA (Table 3).

TABLE 3

Ethylenediamine-Derivatized Beads

| Ex. | Solution A (ml) | Solution (ml) | Amine Content | IEX Capacity (mg/ml) |
|---|---|---|---|---|
| 12 | 20 | 0       | 39.1 | 18.4 |
| 13 | 10 | (B) 10  | 23.7 | 10.2 |
| 14 | 4  | (B) 16  | 14.1 | 0.7 |
| 15 | 10 | (C) 10  | 27.2 | 7.7 |

The results again show that the level of ligand incorporation is easily controlled along with corresponding control of ion exchange capacity. In addition, the results indicate that choice of quencher may exercise additional control over ligand density and capacity (compare Examples 13 and 15, where identity of quencher seems to change effectiveness of the ligand in terms of the expressed ion exchange capacity).

EXAMPLES 16–19

The following ligand solution was prepared:

Solution A—1.0M 2-diethylaminoethylamine

Quencher solutions B and C from Examples 12–15 were used to prepare mixtures for derivatization of Emphaze AB 1 beads as before (Table 4).

TABLE 4

DEAE-Derivatized Beads

| Ex. | Solution A (ml) | Solution (ml) | Amine Content | IEX Capacity (mg/ml) |
|---|---|---|---|---|
| 16a | 20 | 0       | 30.2 | 15.4 |
| 16b | 20 | 0       | 32.7 | 15.7 |
| 17  | 10 | (B) 10  | 26.8 | 9.2 |
| 18  | 10 | (C) 10  | 21.1 | 2.8 |
| 19  | 2  | (C) 18  | 16.4 | 0.3 |

EXAMPLES 20–22

These examples illustrate control of ligand density when coupling an aromatic amine-functional ligand. The following solutions were prepared:

Solution A (ligand solution)—1.0M 4-aminobenzylamine in 0.1M MES (4-morpholineethanesulfonic acid), pH 4.0.

Solution B (quencher solution)—1.0M aniline in 0.1M MES, pH 4.0.

Mixtures of Solutions A and B were prepared and reacted with 1.25 g samples of Emphaze AB 1 beads at room temperature overnight in the presence of 300 mg EDC (N-ethyl-N'-dimethylaminopropylcarbodiimide). Workup and evaluation of ligand density (amine content) and anion exchange capacity for BSA was done as in previous examples (Table 5).

TABLE 5

Benzylamine-Derivatized Beads

| Ex. | Solution A (ml) | Solution B (ml) | Amine Content | IEX Capacity (mg/ml) |
|---|---|---|---|---|
| 20 | 20 | 0  | 36.8 | 35.8 |
| 21 | 10 | 10 | 26.8 | 9.3 |
| 22 | 4  | 16 | 3.3  | 0.8 |

These examples illustrate control of ligand density when the ligand being coupled is an aromatic amine and coupling must be assisted with a condensation agent, in this case a carbodiimide. This technique can also be used to control the ligand density of 4-aminobenzamidine, an affinity ligand for purification of trypsin and similar enzymes.

EXAMPLES 23–28

These Examples illustrate the relative ineffectiveness of polyanionic salts to influence the coupling of low molecular weight ligands. The following solutions were prepared:

Solution A (ligand solution)—1.0M 2-diethylaminoethylamine (DEAEA)

Solution B (ligand solution)—1.0M DEAEA in 1.0M sodium sulfate

Solution C (ligand solution)—0.5M ethylenediamine

Solution D (ligand solution)—0.5M ethylenediamine in 1.0M sodium sulfate

Solution E (quencher solution)—1.0M ethanolamine

Solution F (quencher solution)—1.0M ethanolamine in 1.0M sodium sulfate

Mixtures were prepared, reacted with Emphaze AB 1 beads, and evaluated as in previous examples (Table 6).

TABLE 6

Amine-derivatized Beads - Polyanionic Salt Effects

| Ex. | Solution (ml) | Solution (ml) | Amine Content | IEX Capacity (mg/ml) |
|---|---|---|---|---|
| 23 | (A) 20 | 0 | 22.8 | 17.0 |
| 24 | (B) 20 | 0 | 26.0 | 19.5 |
| 25 | (A) 10 | (E) 10 | 20.5 | 13.9 |
| 26 | (B) 10 | (F) 10 | 24.0 | 15.1 |
| 27 | (C) 10 | (E) 10 | 18.2 | 8.0 |
| 28 | (D) 10 | (F) 10 | 20.8 | 11.0 |

The differences in ligand content or IEX capacity obtained for coupling in the presence or absence of the polyanionic salt, sodium sulfate, are essentially within the variability observed for the test methods or for duplicate reactions (see, for example, Examples 16a and 16b).

COMPARATIVE EXAMPLES 1–3

These Examples illustrate the importance of conducting the derivatization reaction near the pK of the ligand and quencher. The following solutions were prepared:

Solution A (ligand solution)—0.5M 1,6-hexanediamine, pH 7.5

Solution B (ligand solution)—0.5M 1,6-hexanediamine in 1.0M sodium sulfate, pH 7.5

Solution C (quencher solution)—1.0M ethanolamine, pH 7.5

Solution D (quencher solution)—1.0M ethanolamine in 1.0M sodium sulfate, pH 7.5

Mixtures were prepared, reacted with Emphaze AB 1 beads, and evaluated as in previous examples (Table 7)

TABLE 7

Coupling of Aliphatic Ligands at pH 7.5

| Comparative Example | Solution (ml) | Solution (ml) | Amine Content |
|---|---|---|---|
| 1 | A (20) | 0 | 14.5 |
| 2 | A (10) | C (10) | 11.6 |
| 3 | B (10) | D (10) | 8.7 |

The results indicate that coupling at pH 7.5, in this case about 4 pH units below the pK of the ligand, results in a dramatic lowering in the density of coupled ligand, probably the result of competitive side reactions such as hydrolysis. Again, polyanionic salt has no enhancing effect.

EXAMPLES 29–30

These examples illustrate the control of ligand density for hydrophobic interaction chromatography. The following solutions were prepared:

Solution A (ligand solution)—0.5M benzylamine, pH 11.0

Solution B (quencher solution)—0.5M ethanolamine, ph 11.0

Mixtures of Solutions A and B were prepared and reacted with Emphaze beads as in previous examples. The samples were evaluated using a Waters Delta Prep 3000 chromatograph equipped with a Waters Lambda Max UV spectrophotometer and Maxima data acquisition software. Bead samples were packed in a Waters AP-1 column to a bed height of 1.3 cm (1.0 ml total volume). The binding buffer consisted of 1.5M ammonium sulfate, 50 mM sodium phosphate, pH 7.1; the elution buffer consisted of 50 mM sodium phosphate, pH 7.1; the sample protein solution consisted of chicken egg white lysozyme dissolved at a concentration of 5 mg/ml in the binding buffer. Five ml of sample protein solution was loaded onto the column at a rate of 1 ml/min. The column was then washed for 5 min with binding buffer at a rate of 1 ml/min, then for 10 min at 2 ml/min. The buffer was then changed to the elution buffer in a single step. Elution of the bound protein was monitored spectrophotometrically until the optical density of the eluted fractions returned to baseline. Example 29, derivitized with 20 ml of Solution A, was found to bind almost all of the applied protein, and the elution removed the bound protein in a sharp, symmetrical peak with a maximum optical density of about 0.7. Example 30, derivatized with a 50:50 mixture of Solutions A and B, showed a large amount of unbound protein in the flow through fractions, while the elution peak for the bound protein showed a maximum optical density of about 0.35.

EXAMPLES 31–33

These examples illustrate the attempt to control ligand density upon derivatization of oxirane (epoxy-functional) beads. The oxirane beads were prepared as follows:

A 1-liter creased, round bottomed flask equipped with a mechanical stirrer (stirring rate 450 rpm), nitrogen gas inlet, thermometer, and condenser was charged with toluene (188 ml), 0.133 g poly(isooctylacrylate-co-acryloylaminoisobutyramide), heptane (348 ml), and glycidylmethacrylate (0.72 ml). This mixture was stirred and heated to 35° C. while sparging with nitrogen. To the stirring mixture was added a solution of methylenebisacrylamide (13.3 g), isopropanol (90 ml), sodium persulfate (0.55 g), and deionized water (60 ml). After stirring for an additional 5 minutes, tetramethylethylenediamine (0.55 ml) was added to initiate polymerization. Polymerization was allowed to continue for a total of 4 hours, then the resultant beads were filtered, washed with acetone three times, and dried under vacuum overnight to produce oxirane beads having approximately 40 micromoles of epoxide functionality per milliliter of support. Beads from a 38–106 micrometer sieve cut were used in the derivatization experiments.

Solutions A and E from Examples 23–28 were used to derivatize 1.0 g samples of the above oxirane beads. Evaluation was conducted as in previous examples (Table 8).

TABLE 8

Derivatization of Oxirane Beads

| Ex. | Solution A (ml) | Solution E (ml) | Amine Content | IEX Capacity (mg/ml) |
|---|---|---|---|---|
| 31 | 20 | 0 | 39.1 | 26.7 |
| 32 | 10 | 10 | 33.6 | 25.4 |
| 33 | 4 | 16 | 32.3 | 22.9 |

These experiments show that a large change in the ratio of ligand to quencher has relatively little effect on the ligand level or chromatographic behavior of the derivatized beads.

While embodiments have been identified and exemplified, the following claims and their equivalents provide the scope of the present invention.

What is claimed is:

1. A method for controlling density of ligand coupled to an azlactone functional support, comprising the step of reacting ligand and quencher with activated sites on a support under conditions sufficient to promote competition of ligand with quencher for the activated sites, wherein the ligand is a molecule having a molecular weight of less than about 1,000 atomic mass units, and wherein the concentration of ligand and the concentration of quencher are within two orders of magnitude; wherein there is a linear relationship between the molar ratio of ligand concentration to quencher concentration and density of ligand coupled to the support; and wherein there is a linear relationship between molar ratio of ligand concentration to quencher concentration and chromatographic performance of the support.

2. The method of claim 1, wherein the pH of the reaction ranges from about 3 to about 12 and within 4 pH units of the pK of the ligand.

3. The method of claim 1, wherein the concentration of quencher ranges from 0.01M to 10M.

4. The method of claim 1, wherein the support is porous.

5. The method of claim 4, wherein the porous support is a porous particle.

6. The method of claim 1, wherein the support is directly covalently reactive with the ligand and the quencher.

7. The method of claim 1, wherein the ligand comprises amine-containing compounds, thiol-containing compounds, or alcohol-containing compounds and wherein the quencher comprises a compound that competes with the ligand for covalent reaction with azlactone on the support.

8. The method of claim 7, wherein the ligand is an amine-containing compound and the quencher is an amine-containing compound.

9. The method of claim 8, wherein the ligand is an amino acid.

10. The method of claim 9, wherein the quencher is selected to determine hydrophilicity of the support.

11. A derivatized support, comprising a support having both ligand and quencher coupled to activated sites on the support according to the method of claim 1.

12. The derivatized support, according to claim 11, wherein the support is directly reactive with ligand and quencher without need for an intermediate activation step.

13. The derivatized support, according to claim 12, wherein the ligand comprises an amine-containing compound, a thiol-containing compound, or an alcohol-containing compound.

14. The derivatized support, according to claim 13, wherein the support is a porous particle.

15. The derivatized support, according to claim 13, wherein the quencher is selected to determine hydrophilicity of the derivatized support.

16. A derivatized support, comprising an azlactone-functional support having activated sites covalently reacted with ligand and quencher, wherein the density of ligand coupled to the support ranges from about 10% to about 99% of the original activated sites, and wherein there is a linear relationship between molar ratio of ligand concentration to quencher concentration and the chromatographic performance of the support.

17. The derivatized support, according to claim 16, wherein the ligand comprises an amine-containing compound, a thiol-containing compound, or an alcohol-containing compound.

* * * * *